United States Patent
Krishnamurthi et al.

(10) Patent No.: US 8,099,112 B2
(45) Date of Patent: Jan. 17, 2012

(54) NETWORK ENTITY, METHOD AND COMPUTER PROGRAM PRODUCT FOR DYNAMICALLY CHANGING A REQUEST FOR LOCATION INFORMATION

(75) Inventors: Govindarajan Krishnamurthi, San Diego, CA (US); Tat Keung Chan, San Diego, CA (US)

(73) Assignee: Nokia Corporation (FI)

( * ) Notice: Subject to any disclaimer, the term of this patent is extended or adjusted under 35 U.S.C. 154(b) by 1005 days.

(21) Appl. No.: 11/406,026

(22) Filed: Apr. 18, 2006

(65) Prior Publication Data

US 2006/0258371 A1 Nov. 16, 2006

Related U.S. Application Data

(60) Provisional application No. 60/672,471, filed on Apr. 18, 2005.

(51) Int. Cl.
*H04Q 4/20* (2006.01)
(52) U.S. Cl. ............... 455/456.6; 455/456.1; 455/456.2; 455/456.3; 455/456.4; 455/456.5
(58) Field of Classification Search ............... 455/456.1, 455/456.2, 456.3, 456.4, 456.6
See application file for complete search history.

(56) References Cited

U.S. PATENT DOCUMENTS

| | | | |
|---|---|---|---|
| 6,611,688 B1 * | 8/2003 | Raith | 455/456.1 |
| 7,254,404 B2 * | 8/2007 | van Diggelen et al. | 455/456.1 |
| 2005/0136942 A1 | 6/2005 | Timiri et al. | |
| 2006/0276167 A1 * | 12/2006 | Burroughs | 455/404.2 |

FOREIGN PATENT DOCUMENTS

| | | |
|---|---|---|
| EP | 1463269 A2 | 9/2004 |
| EP | 1617686 A1 | 1/2006 |
| WO | WO 2004092762 A1 | 10/2004 |
| WO | WO 2005079002 A1 | 8/2005 |

OTHER PUBLICATIONS

*IP-Based Location Services*; 3rd Generation Partnership Project 2 "3GPP2"; Oct. 2005; 215 pages (108 condensed pages); Version 1.0; 3GPP2 X.S0024-0.

* cited by examiner

*Primary Examiner* — Charles Shedrick
(74) *Attorney, Agent, or Firm* — Alston & Bird LLP

(57) ABSTRACT

A network entity includes a controller adapted to operate a location-based application for initiating a location reporting session. The location reporting session includes determining and reporting a current location of a mobile station based on one or more parameters having one or more associated values, where, when the session is a periodic location reporting session, one of the parameters may be a periodicity of reporting the current location of the mobile station. The location-based application is also adapted to change the value of one or more of the parameters during the location reporting session. The same location reporting session may therefore continue based on the changed values of the respective parameter(s).

30 Claims, 9 Drawing Sheets

NETWORK ENTITY, METHOD AND COMPUTER PROGRAM PRODUCT FOR DYNAMICALLY CHANGING A REQUEST FOR LOCATION INFORMATION

CROSS REFERENCE TO RELATED APPLICATION(S)

This application claims the benefit of U.S. Provisional Patent Application No. 60/672,471, entitled: System and Method for Dynamically Changing a Request for Location Information, and filed Apr. 18, 2005, the content of which is incorporated herein in its entirety.

FIELD OF THE INVENTION

The present invention relates generally to systems and methods for providing location information regarding a mobile station and, more particularly, relates to systems and methods for dynamically changing a request for location information regarding a mobile station.

BACKGROUND OF THE INVENTION

In many wireless communication networks and other mobile networks, the network keeps track of the location of mobile stations, such as mobile telephones, at least on a cell level. In such networks, it is typically also possible to determine the geographical location of the mobile stations, and deliver the geographical location to a requesting entity, according to various well known techniques. For example, the Third Generation Partnership Project 2 (3GPP2) and Open Mobile Alliance (OMA) are developing techniques for delivering location information in the context of providing IP-based location services. Information regarding the location of the mobile stations can be utilized for a number of different purposes, such as for routing and charging, as well as for support of location services.

Various service announcements can be transmitted to mobile stations on the basis of a service request of a subscriber in mobile communication systems. Generally, these chargeable services are most often arranged to be provided from outside the actual mobile communication system. By making a call to a required service number or sending a request over the Internet, for example, a mobile subscriber is able to order a selected service announcement to be delivered to the display of the mobile station, for example. Of these individual services, e.g., weather forecast, traffic announcements, local news and other local services, such as taxi ordering and service station announcements and so on are services where the mobile subscriber selects the desired announcement on the basis of the geographical area. The mobile subscriber generally wishes to have the service announcement related to his/her current location which varies because of the mobile nature of the mobile subscriber.

Typically, mobile networks are configured such that an entity, sometimes referred to as a location-based application (LBA), may be co-located or otherwise in communication with a LoCation Services (LCS) client to request the location of a mobile station via a single or periodic request that includes a number of parameters for operations triggered by receipt of the request. With periodic LCS requests, the position of the mobile station may be determined and reported to the LBA/LCS client in a periodic fashion, where the total number of requests, the time interval between requests and one or more other related parameters may be specified to the mobile station beforehand by the LBA/LCS client/position server. If the conditions that were initially used to specify parameters in the location request do not remain the same for the entire duration, however, such periodic location reporting may be inefficient. In other words, it is more realistic that when the conditions at the LBA, for example, change, appropriate parameters in the request would also change. For example, as currently defined by 3GPP2 and the OMA, the periodicity (frequency of reporting the current location) parameter in these requests is constant and cannot be changed unless the current request is torn down and a new request is initiated. In scenarios such as wireless local area network (WLAN)—wide area network (WAN) interworking, it may be beneficial to perform periodic location requests of a mobile station where the time intervals between requests are determined dynamically, based on application specific considerations. Current specifications, however, do not permit efficiently changing parameters when conditions at the LBA require a change in parameters, while processing any location request, whether a periodic location request or a single location request (e.g., single, delayed or deferred location request).

SUMMARY OF THE INVENTION

In light of the foregoing background, exemplary embodiments of the present invention provide an improved network entity, method and computer program product for dynamically and efficiently modifying parameters, such as the periodicity, within a LoCation Services (LCS) request. For a better understanding of a scenario that would benefit from being able to adjust parameters dynamically, consider a WLAN-WAN interworking scenario. Within such a scenario, the advantages of exemplary embodiments of the present invention to dynamically change the periodicity, a parameter in the LCS request, become more readily apparent. For a mobile station with both a WAN (e.g., cellular) interface and a WLAN interface, it is possible for the mobile station to switch from one interface to the other for better connectivity, speed, quality of service (QoS) and the like. Thus, consider a mobile station that is obtaining data service through cellular access when the mobile station enters an area where WLAN access is available, and accordingly discovers the WLAN access. In such an instance, the mobile station may switch to WLAN access (or the operator may instruct the mobile station to do so in order to offload to the WLAN network) for better services or any other reasons. However, it is power-consuming for the mobile station to constantly scan the WLAN spectrum for possible WLAN access. Therefore, it is desirable for the mobile station to only switch on the WLAN interface when the likelihood of WLAN access is above a given threshold. In this regard, one piece of information the mobile station can use to determine this likelihood is its current location. In other words, location service can be utilized to assist a mobile station for WLAN interworking.

In a context such as that explained above, however, a traditional periodic location request may not be most efficient. In this regard, when the mobile station remains in an area without WLAN coverage, a longer location request period is desired. On the other hand, when the mobile station is entering an urban area or office building, a much shorter location request period is desirable. In general, the desirable location request period may depend upon characteristics of the mobile station, such as its current location, velocity (which can be determined from previous locations), or the like.

In another illustrative exemplary embodiment, a location-based application tracking a mobile station periodically may require highly accurate positioning when the mobile station is within a certain geographical area. Once the mobile station leaves the area the location-based application may be satisfied with less accurate location information of the mobile station. Clearly in this scenario also, the location-based application should be afforded the mechanisms to dynamically change the parameters. This could be because highly accurate positioning costs more.

According to one aspect of exemplary embodiments of the present invention, a network entity, such as a mobile station or network-based processing element associated with a location-based application, is provided. The network entity includes a controller adapted to operate a location-based application for initiating a location reporting session, whether a periodic or a non-periodic location reporting session. The location reporting session includes determining and reporting a current location of a mobile station based on one or more parameters having one or more associated values. The parameters may include a location quality of service (QoS), and more particularly when the location reporting session is a periodic location reporting session, may include a periodicity of reporting the current location of the mobile station. The location-based application is also adapted to change the value of one or more of the parameters, such as by changing the value of the periodicity and/or location (QoS), during the location reporting session. The same location reporting session may therefore continue based on the changed values of the respective parameter(s).

The location reporting session may include communication between a plurality of entities including the mobile station, a home position server and a position determining entity. Thus, the location-based application may also be adapted to notify the home position server and/or the position determining entity of the changing of the value of the respective parameter(s).

The network entity may comprise, or alternatively be located remote from, the mobile station. The location reporting session may further include exchanging messages between a LoCation Services (LCS) client of the mobile station and a position determining entity to thereby determine the current position of the mobile station. When the network entity comprises the mobile station, the current position of the mobile station may be reported to the location-based application via the LCS client of the mobile station. And when the network entity is located remote from the mobile station, the current position of the mobile station may be reported to the location-based application via the position determining entity.

The location reporting session may include determining and reporting the current location of the mobile station at a plurality of instances. And in this regard, the location-based application may also be adapted to change the value of the respective parameter(s) after at least some of the instances of determining and reporting the current location of the mobile station. Additionally or alternatively, the location-based application may be adapted to change the value of the respective parameter(s) in response to meeting one or more conditions, such as one or more conditions based on a reported current location of the mobile station.

According to other aspects of the present invention, a method and a computer program product are provided. As indicated above and explained below, the network entity, method and computer program product of exemplary embodiments of the present invention may solve the problems identified by prior techniques and may provide additional benefits.

BRIEF DESCRIPTION OF THE DRAWINGS

Figure 1A:
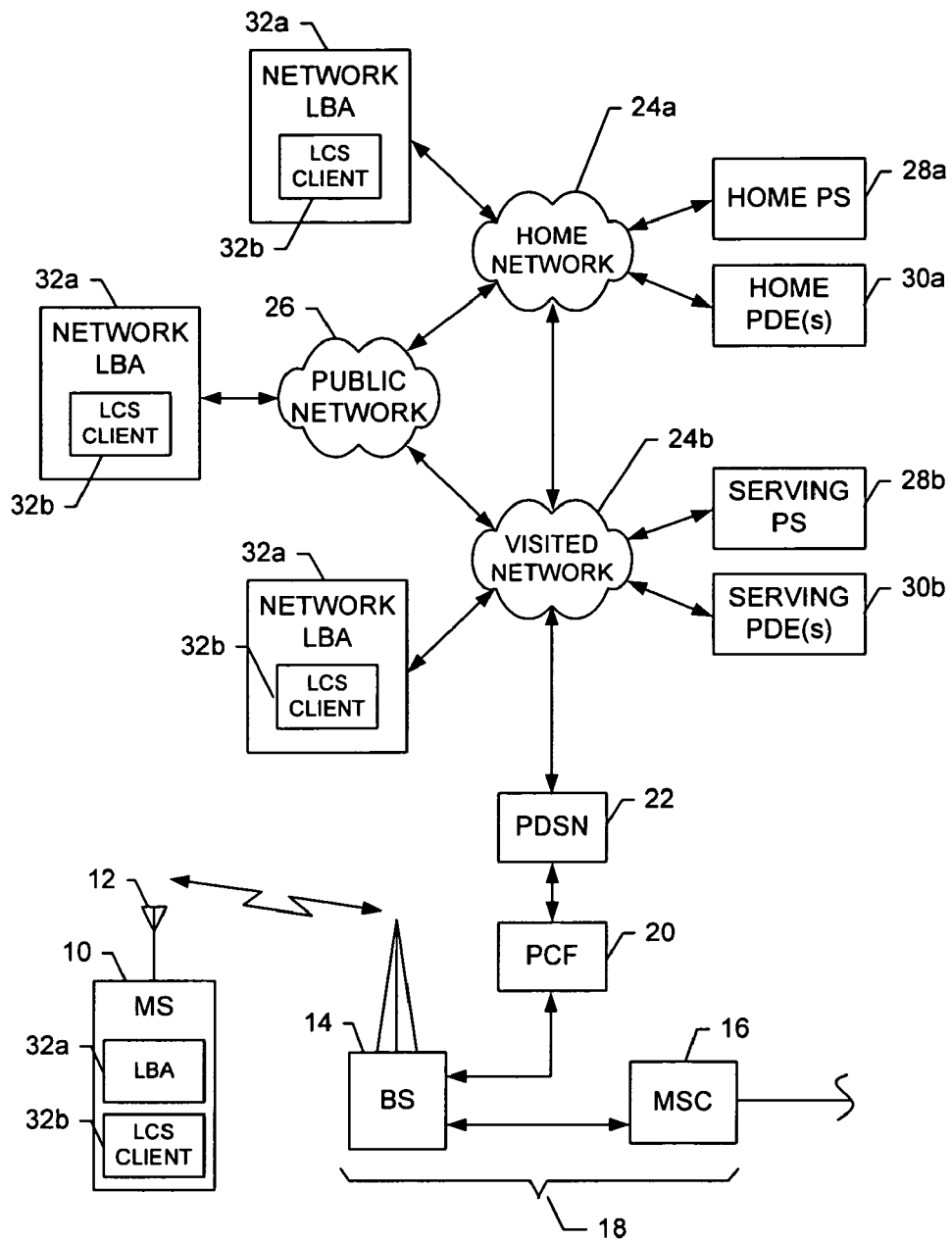
Figure 1B:
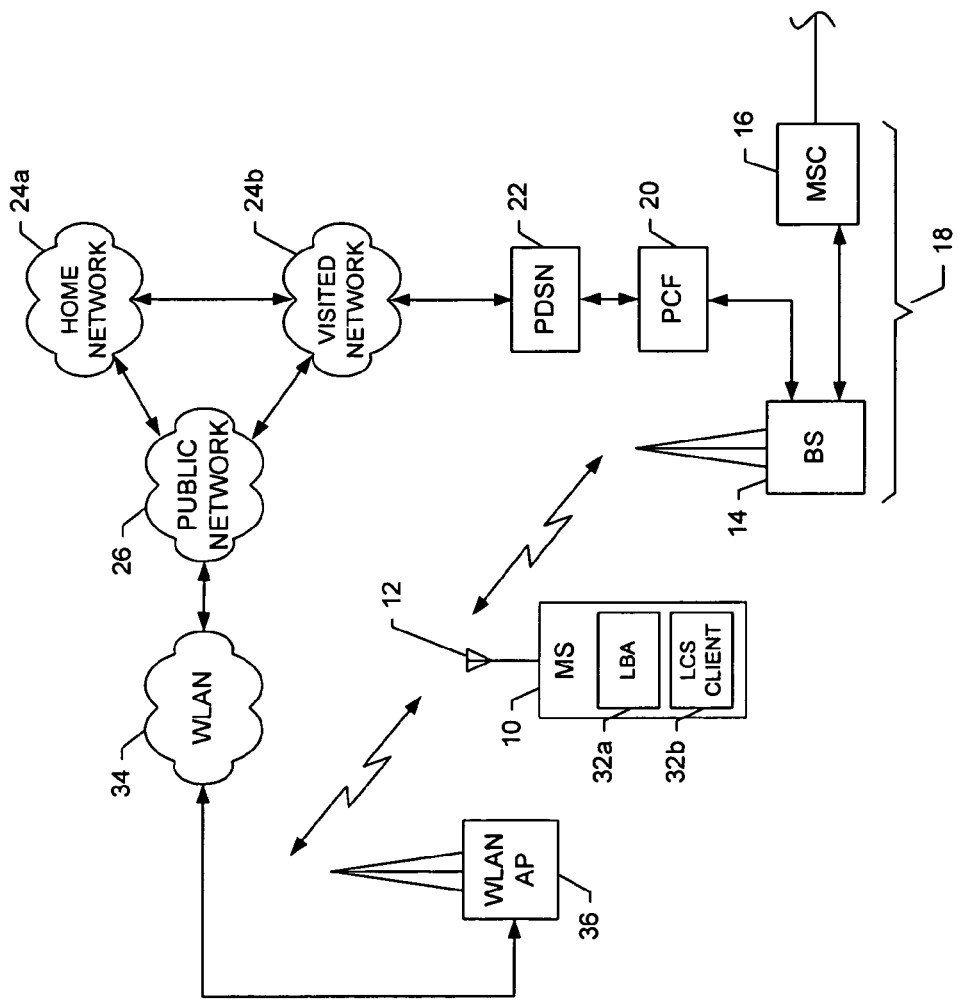
Figure 2:
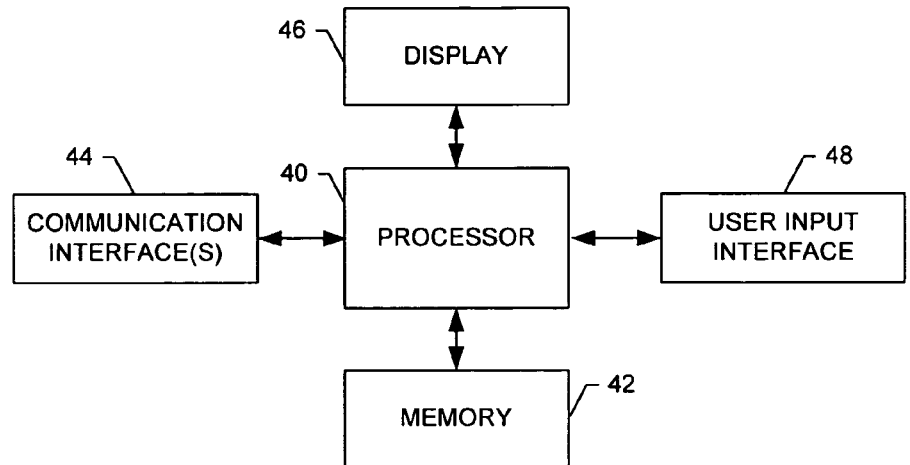
Figure 3:
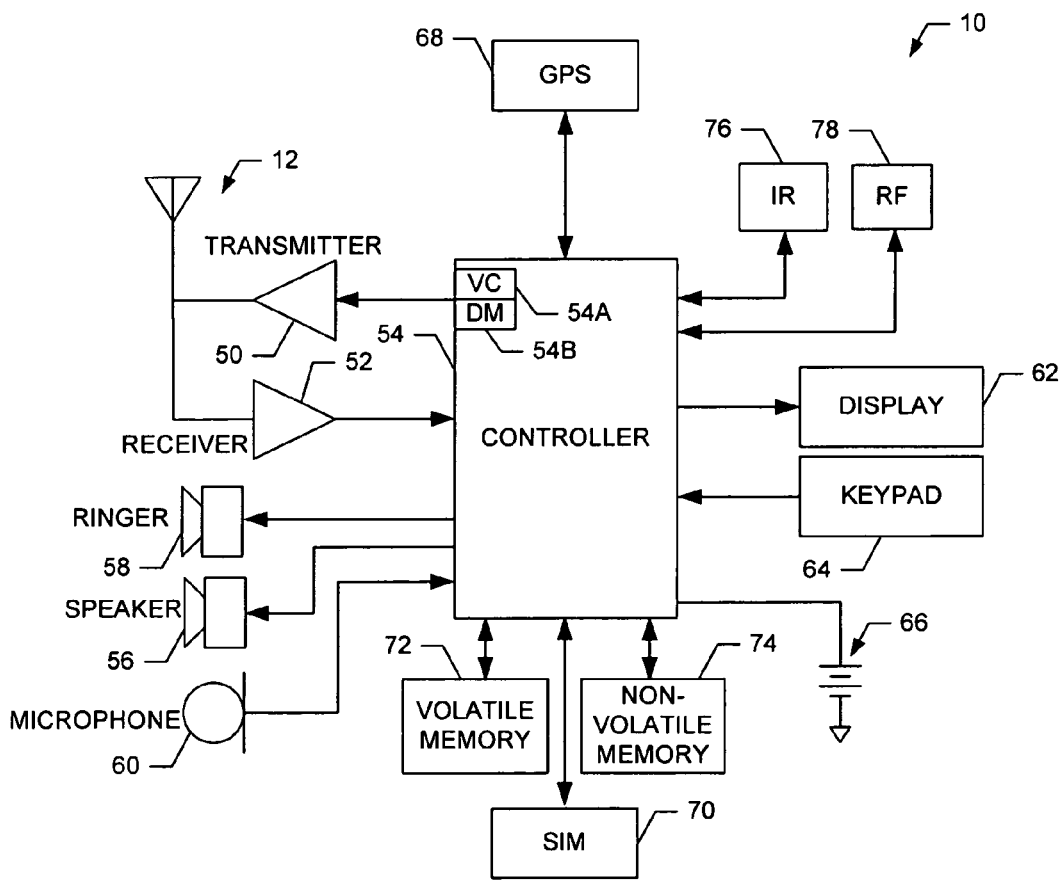
Figure 4A:
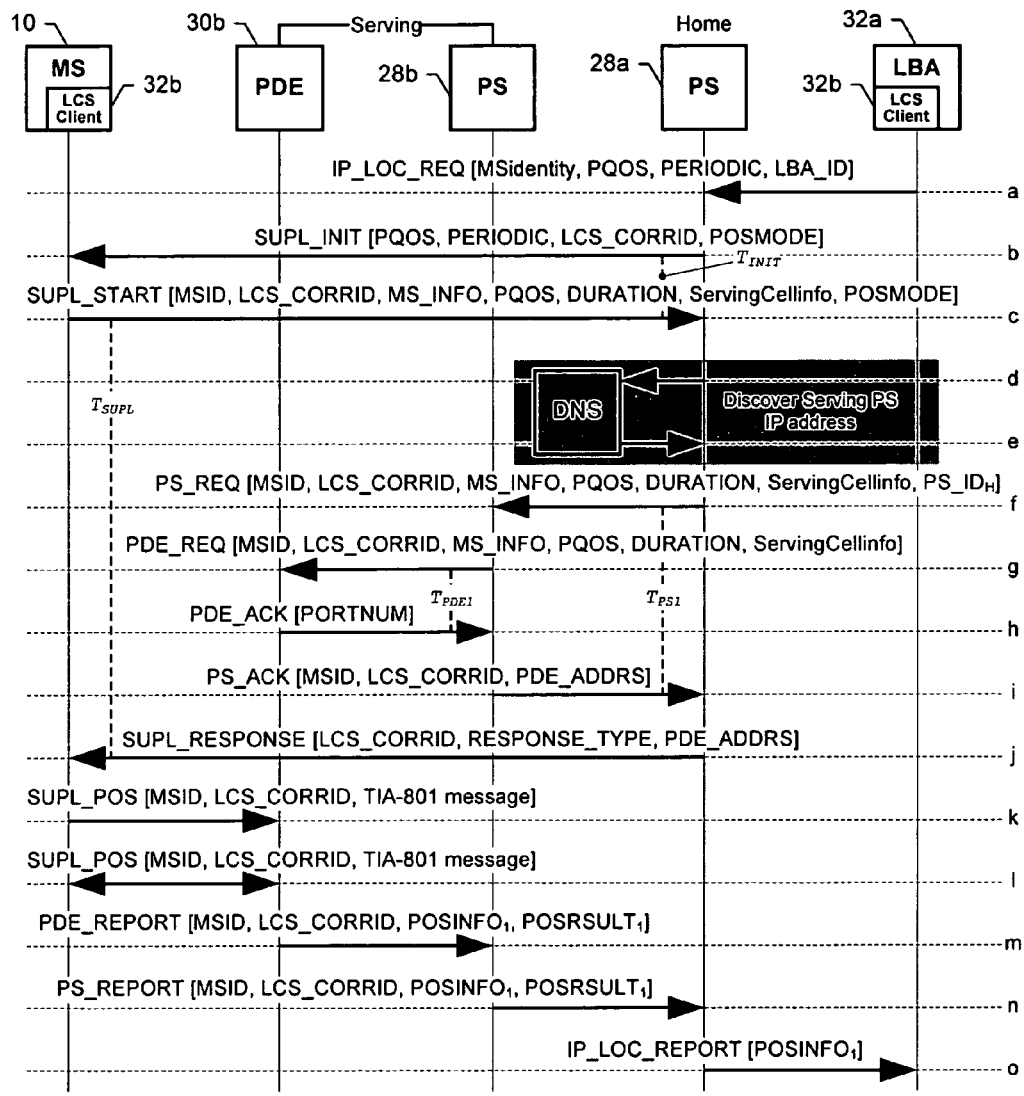
Figure 4B:
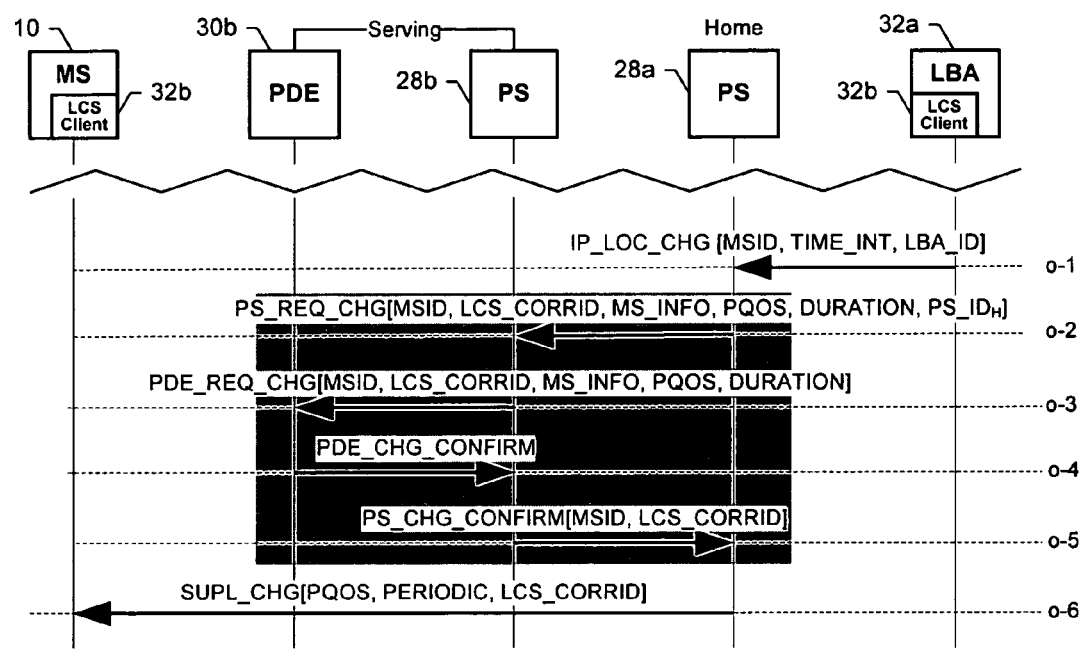
Figure 4C:
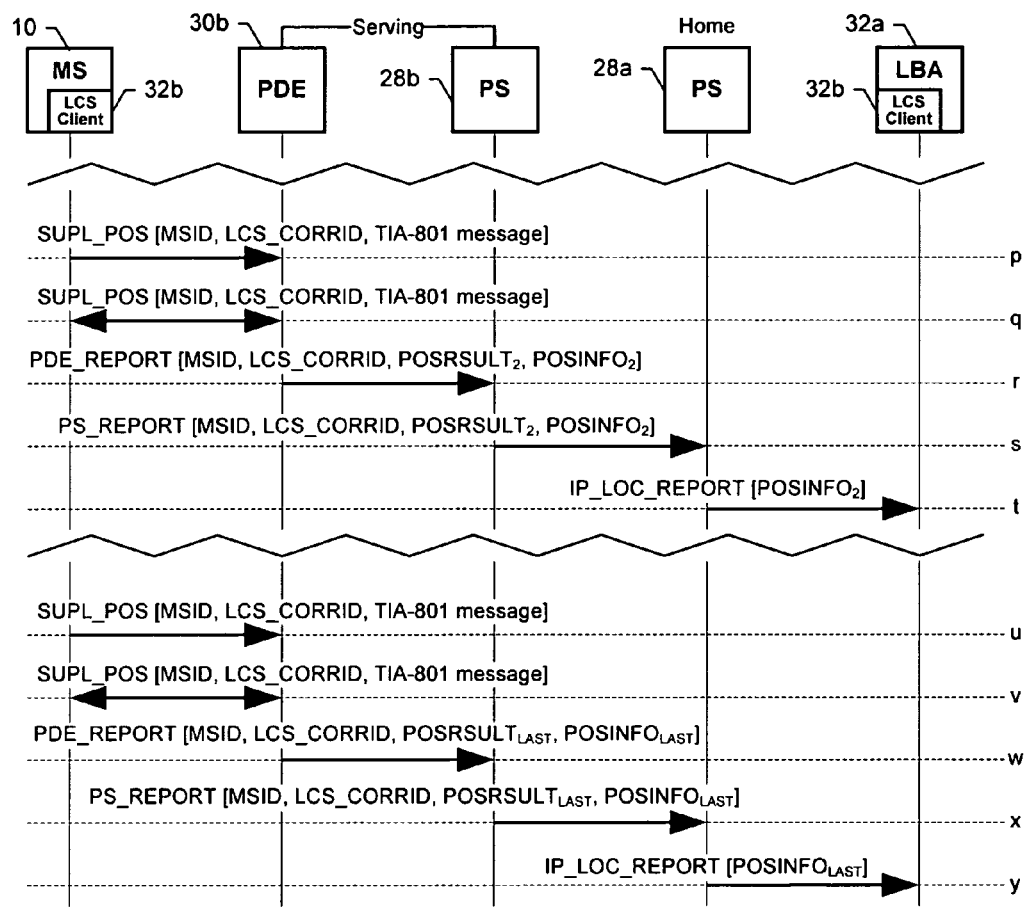
Figure 5A:
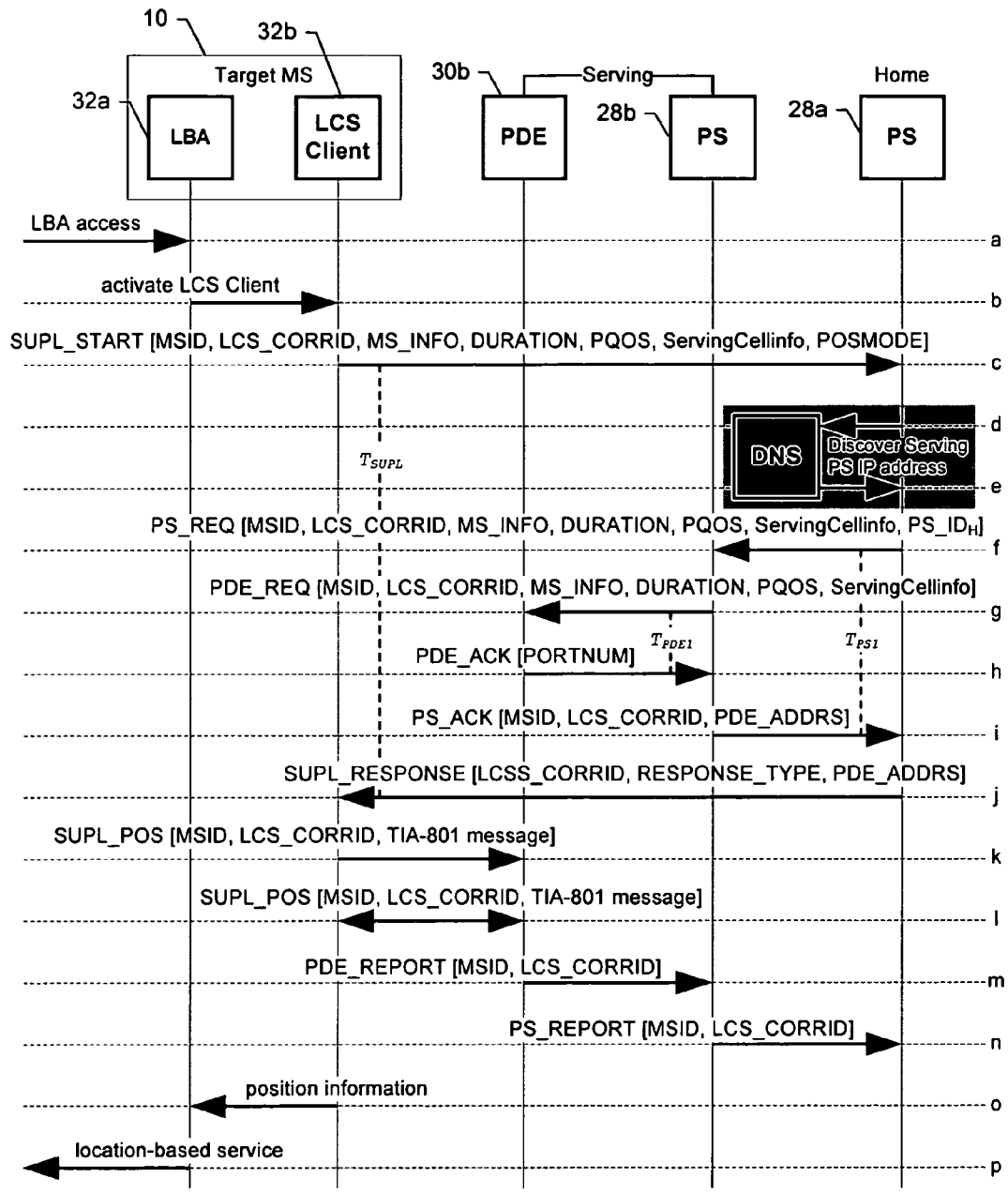
Figure 5B:
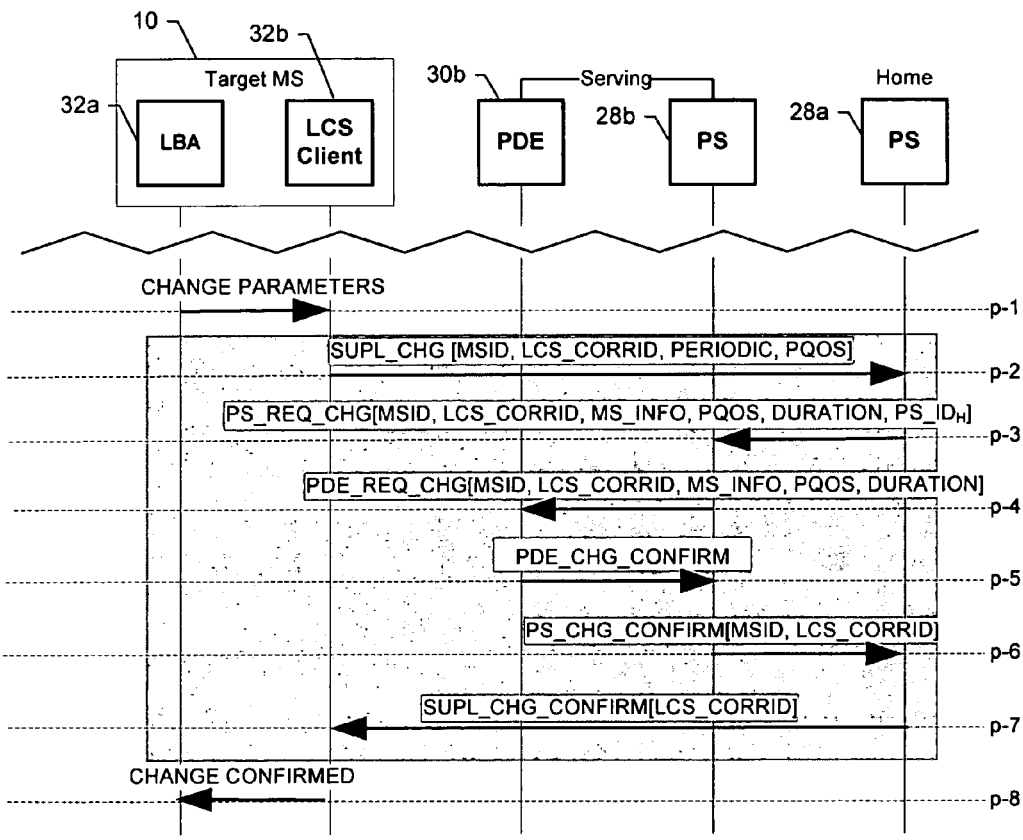
Figure 5C:
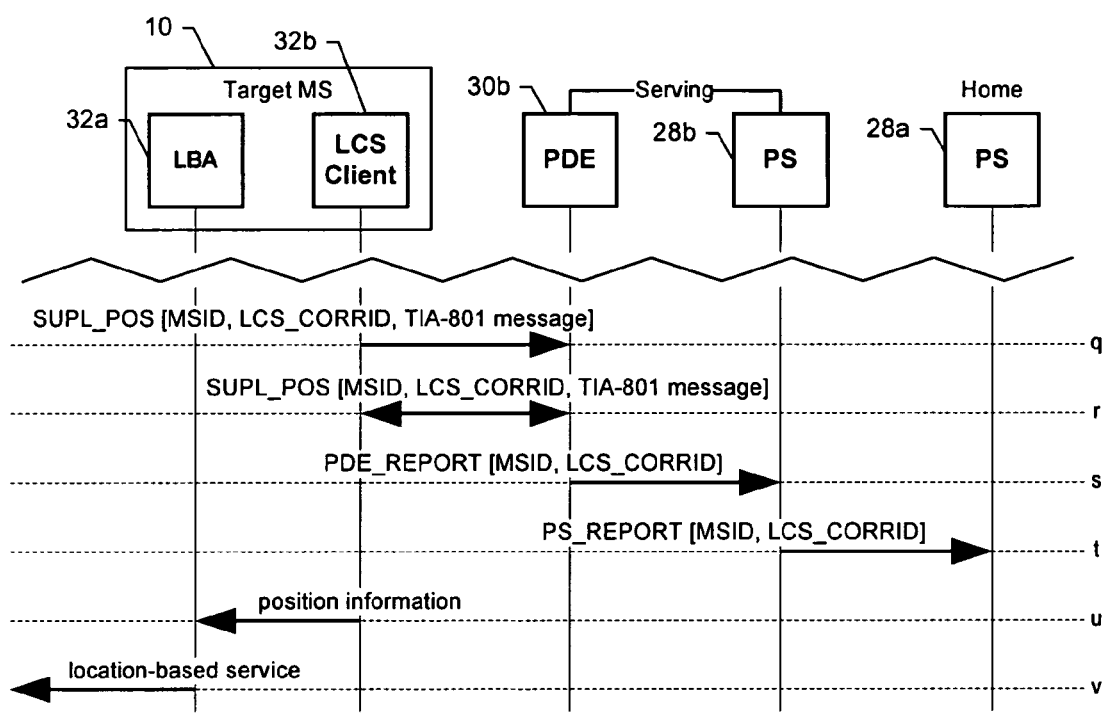

Having thus described the invention in general terms, reference will now be made to the accompanying drawings, which are not necessarily drawn to scale, and wherein:

FIGS. 1a and 1b are schematic functional block diagrams of wireless communications systems configured in accordance with exemplary embodiments of the present invention;

FIG. 2 is a schematic block diagram of an entity capable of operating as a mobile station, position server, position determining entity, LBA and/or LCS client, in accordance with exemplary embodiments of the present invention;

FIG. 3 is a schematic block diagram more particularly illustrating a mobile station according to one exemplary embodiment of the present invention;

FIGS. 4a-4c are control flow diagrams illustrating various steps in a method of requesting the location of a mobile station in the context of network-initiated, mobile station-assisted requests for location information, according to one exemplary embodiment of the present invention; and FIGS. 5a-5c are control flow diagrams illustrating various steps in another method of requesting the location of a mobile station in the context of mobile station-initiated, mobile station-assisted requests for location information, according to one exemplary embodiment of the present invention.

DETAILED DESCRIPTION OF THE INVENTION

The present invention now will be described more fully hereinafter with reference to the accompanying drawings, in which preferred exemplary embodiments of the invention are shown. This invention may, however, be embodied in many different forms and should not be construed as limited to the exemplary embodiments set forth herein; rather, these exemplary embodiments are provided so that this disclosure will be thorough and complete, and will fully convey the scope of the invention to those skilled in the art. Like numbers refer to like elements throughout.

Referring to FIGS. 1a and 1b, functional illustrations of wireless communications networks configured in accordance with exemplary embodiments of the present invention are provided. As shown in FIGS. 1a and 1b, the networks of exemplary embodiments of the present invention include a mobile station (MS) 10, such as a mobile telephone. It should be understood, however, that the mobile telephone illustrated and hereinafter described is merely illustrative of one type of mobile station that would benefit from the present invention and, therefore, should not be taken to limit the scope of the present invention. While several exemplary embodiments of the mobile station are illustrated and will be hereinafter described for purposes of example, other types of mobile stations, such as portable digital assistants (PDAs), pagers, tracking devices, laptop computers and other types of voice and text communications systems, can readily employ the present invention. Moreover, the system and method of the present invention will be primarily described in conjunction with mobile communications applications. But the system and method of the present invention can be utilized in conjunction with a variety of other applications, both in the mobile communications industries and outside of the mobile communications industries.

As shown, the mobile station 10 includes an antenna 12 for transmitting signals to and for receiving signals from a base site or base station (BS) 14. The base station is a part of a cellular network that may include a mobile switching center (MSC) 16 and other units required to operate the network. The MSC, if present, is adapted to route circuit-switched calls and messages to and from the mobile station when the mobile station is making and receiving calls. The MSC controls the forwarding of messages to and from the mobile station when the station is registered with the network, and also controls the forwarding of messages for the mobile station to and from a message center (not shown). Also, although not shown, subscriber data of the mobile station can be permanently stored in a home location register (HLR) of a cellular network, often referred to as the "home cellular network" (not shown). Likewise, subscriber data of the terminal can be temporarily stored in a visitor location register (VLR) of the visited cellular network when the terminal roams into another cellular network, referred to herein as the "visited cellular network" 18.

The cellular network can comprise one or more of a number of different mobile networks. In this regard, the cellular network can comprise any of a number of first-generation (1G), second-generation (2G), 2.5G and/or third-generation (3G) cellular networks, and/or any of a number of other cellular networks adapted to operate in accordance with exemplary embodiments of the present invention. For example, the cellular network can comprise a GSM (Global System for Mobile Communication), IS-136 (Time Domain Multiple Access—TDMA), IS-95 (Code Division Multiple Access—CDMA), cdma2000, WCDMA (Wideband CDMA) or EDGE (Enhanced Data GSM Environment) network. Further, the cellular network can comprise an enhanced 3G wireless communication network such as a high rate packet data (HRPD) communication network including, for example, a 1XEV-DO (TIA/EIA/IS856) or 1XEV-DV network. Alternatively, the cellular network can comprise GPRS (General Radio Packet Service) or GPRS-based (e.g., Universal Mobile Telecommunications System—UMTS) networks.

The mobile station 10 can also be coupled to a data network. For example, the base station 14 can be connected to a packet control function (PCF) 20, which is in connection with a Packet Data Serving Node (PDSN) 22. The PDSN is connected to an operator network 24 (e.g., local area network—LAN). As shown, the operator network can be further coupled to a public network, such as the Internet 26. Like the operator network, devices such as processing elements can be coupled to the mobile station via the Internet. Further, the Internet can be coupled to other operator networks. In this regard, as will be appreciated, the operator network coupled to the home cellular network is often referred to as the "home network" 24a. In contrast, the operator network coupled to the base station of the visited cellular network 18 is often referred to as the "visited network" 24b. In this regard, for purposes of clarity and explanation below, the mobile station is shown within the visited network via the visited cellular network 18. It should be understood, however, that the home networks generally include the same elements as the visited networks. Accordingly, functions of the system and method of exemplary embodiments of the present invention shown and described as occurring within the visited networks may equally occur within the home networks.

As shown in FIG. 1a, devices such as processing elements (e.g., personal computers, server computers or the like) can be coupled to the mobile station 10 via the operator networks 24. For example, the processing elements can include one or more processing elements associated with one or more position servers (PS) (including a home PS 28a and a serving PS 28b), one or more position-determining entities (PDEs) (including home PDEs 30a and serving PDEs 30b) and/or one or more location-based applications (LBAs) 32a, as explained below. It should be understood that although the terms "position server," "position determining entity" are defined by 3GPP2, such terms are used herein without loss of generality to the functions performed by the respective entities. As explained herein, the position servers 28 coordinate location services for different applications or LBAs 32a, which are co-located or otherwise in communication with respective LoCation Services (LCS) clients 32b. In general terms, the position server can be defined as an entity adapted to provide information concerning the geographical location of the mobile station 10. The position server also coordinates the process by which a given mobile station's location information is determined. In this regard, the position server may be coupled to a position determining entity 30 adapted to determine the location information provided by the position server. The geographical location may be defined on the basis of the position of the mobile station relative to the base station 14 of the wireless communications network.

The geographical location of the base station 14 and/or the mobile station 10 may be defined, for example, in X and Y coordinates or in latitudes and longitudes. A possibility is to use the relation between defined radiuses and angles, e.g. based on the spherical coordinate system or the like. It is also possible to define the location of the base stations and/or mobile stations in vertical directions. For example, Z coordinate may be used when providing the location information in the vertical direction. The vertical location may be needed such as to define the location in mountainous environments or in cities with tall buildings. The location information may be determined by communication between the wireless communication network and the mobile station according to one or more appropriate techniques, such as triangulation, Global Positioning System (GPS), Assisted GPS (A-GPS), Time of Arrival (TOA), Observed Time Difference of Arrival (OTDOA) or the like, as such are well known to those skilled in the art. This information may be processed in a predefined manner and then provided to the position server, which can forward the information to the LBA/LCS client 32.

The position server 28 can comprise any of a number of known elements in the wireless communications network such as, for example, a gateway mobile location center (GMLC), as defined by the GSM specification. The position server is typically arranged to receive a request for location information, such as from an LBA/LCS client 32. If the LBA/LCS client is authorized to receive the location information, then, the position server can initiate determining the location of the mobile station, such as by the position determining entity 30. In this regard, the position determining entity is adapted to receive via appropriate interface means predefined information concerning the location of the mobile station 10. The position determining entity is adapted to process the information in order to determine the geographical location of the mobile station. The information received by the position server, and thereafter passed to the position determining entity to initiate determining the location of the mobile station, may include the identity of the mobile station, such as an international mobile subscriber identifier (IMSI), or a temporary identifier, such as a temporary international mobile subscriber identifier (TIMSI). Alternatively, a mobile station can be identified by Network Address Identifiers and other standard IP based identifying mechanisms or mechanisms that are specific to LCS specifications.

Although shown as being coupled to an operator network 24, it should be appreciated that the elements of the position server 28 and/or the position determining entity 30 functionality may be implemented anywhere in the system. The position server and/or the position determining entity implementation may also be distributed between several elements of the network. Alternatively, the position server and the position determining entity implementation may be implemented in a single element. For example, the position server may include, and thus perform the functions, of the position determining entity, as well as the functions of the position server. The position server may also be an external node to the wireless communications network. According to one embodiment, for example, the mobile station or user equipment provides the position server. The mobile station is provided with the position server processing function and is adapted to generate and transport location information thereof to the LBA/LCS client 32. The mobile station may be provided with terminal equipment apparatus (either integrated in the mobile station device or connected thereto). The location information may be based on use of information provided by a system that is separate from the communication system, such as by means of a Global Positioning System (GPS) or similar system.

The position server 28 may consist of a number of location service components and bearers needed to serve the LBA/LCS client 32. The position server may provide a platform which will enable the support of location based services in parallel with other wireless communication services such as speech, data, messaging, other tele-services, user applications and supplementary services. The position server may respond to a location request from a properly authorized LBA/LCS client with location information (determined by the position determining entity 30) for the target mobile station 10 specified by the LBA/LCS client if considerations of target mobile station privacy are satisfied, as described below. The position server may therefore provide the LBA/LCS client, on request or periodically, the current or most recent geographic location (if available) of the target mobile station or, if the location determination fails, an error indication and optionally the reason for the failure. A more detailed description of a position server that may be employed in the exemplary embodiments of the present invention can be found in the European telecommunications Standards Institute (ETSI) technical specification entitled "Location Services" (3GPP TS23.171 and GSM 03.71).

More particularly as to the LCS client 32b, the LCS client is a logical functional entity that may make a request on behalf of an LBA 32a to the entity providing the location service function, such as the position server 28 or the mobile station 10, for the location information of one or more target mobile stations. The LCS client may be an entity, or incorporated within an entity (e.g., the LBA), that is coupled to one or more of the operator networks 24, or coupled to the Internet 26. The LCS client may alternatively reside in the mobile station 10. The LCS clients are entitled to receive at least some degree of information concerning the location (or location history) of the mobile station.

The particular requirements and characteristics of the LBA/LCS client 32 are typically known to the position server 28 by its LBA/LCS client subscription profile. The particular LCS-related restrictions associated with each target mobile station may also be detailed in the target mobile station subscription profile. The location service feature may permit the location of a target mobile station to be determined at any time.

The location information received by the LBA/LCS client 32 may be used for any of a number of different purposes. For example, the LBA/LCS client may transmit location-related information to the mobile station 10 in a particular geographic area, such as on weather, traffic, hotels, restaurants, or the like. Also, for example, the LBA/LCS client may record anonymous location information (i.e., without any mobile station identifier), such as for traffic engineering and statistical purposes. Further, the LBA/LCS client may enhance or support any of a number of supplementary services, such as an intelligent network (IN) service, bearer service and/or tele-service subscribed to by the mobile station subscriber.

The location information can of course be used to determine the location of a mobile station 10 when the mobile station makes an emergency call. There are also several other possible commercial and non-commercial applications that may use the location information. Such possible applications include different local advertisement and information distribution schemes (e.g. transmission of information directed to those mobile users only who are currently within a certain area), area related WWW-pages (such as time tables, local restaurant, shop or hotel guides, maps, local advertisements etc.) for the users of mobile data processing devices, and tracking of mobile users by anyone who wishes to receive this information and is legally entitled to obtain it. An application requiring real-time location information of the movement of a mobile station is a mobile station movement prediction feature that the wireless communication network may utilize, for example, in dynamic network resource allocation. There are still various other possible uses of the location information and applications that would benefit from the location information.

Now, as more particularly shown in FIG. 1b, a wireless communication system is shown configured for WLAN-WAN interworking, in accordance with another exemplary embodiment of the present invention. As shown in FIG. 1b, the mobile station 10 includes both a wireless local area network (WLAN) interface and a wide area network (WAN) interface. With the WAN interface, the mobile station can obtain WAN connectivity through a cellular network as described above. In addition to or in lieu of being coupled to the cellular network 18, the mobile station can be coupled to another wireless (WLAN) network 34 via one or more wireless access points (APs) 36 via the WLAN interface. The APs can comprise access points configured to communicate with the terminal in accordance with techniques such as, for example, radio frequency (RF), Bluetooth (BT), infrared (IrDA) or any of a number of different wireless networking techniques, including WLAN techniques. By directly or indirectly connecting both the mobile station and the other devices to the PDSN and the visited network, the mobile station can communicate with the other devices, such as according to the Internet Protocol (IP) specification, to thereby carry out various functions of the mobile station.

Referring now to FIG. 2, a block diagram of an entity capable of operating as a mobile station 10, position server 28, position determining entity 30 and/or LBA/LCS client 32 is shown in accordance with one exemplary embodiment of the present invention. Although shown as separate entities, in some exemplary embodiments, one or more entities may support one or more of a mobile station, position server, position determining entity and/or LBA/LCS client, logically separated but co-located within the entit(ies). For example, a single entity may support a logically separate, but co-located, LBA and LCS client. Additionally or alternatively, a single entity may support a logically separate, but co-located, mobile station, LBA and LCS client.

The entity capable of operating as a mobile station 10, position server 28, position determining entity 30 and/or LBA/LCS client 32 includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. More particularly, for example, as shown in FIG. 2, the entity can include means, such as a processor 40 connected to a memory 42. The memory can comprise volatile and/or non-volatile memory, and typically stores content, data or the like. For example, the memory typically stores content transmitted from, and/or received by, the entity. Also for example, the memory typically stores client applications, instructions or the like for the processor to perform steps associated with operation of the entity in accordance with exemplary embodiments of the present invention. As explained below, for example, the memory can store client application(s) for implementing functional components of the respective entities.

As described herein, the client application(s) may each comprise software operated by the respective entities. It should be understood, however, that any one or more of the client applications described herein can alternatively comprise firmware or hardware, without departing from the spirit and scope of the present invention. Generally, then, the mobile station 10, position server 28, position determining entity 30 and/or LBA/LCS client 32 can include one or more logic elements for performing various functions of one or more client application(s). As will be appreciated, the logic elements can be embodied in any of a number of different manners. In this regard, the logic elements performing the functions of one or more client applications can be embodied in an integrated circuit assembly including one or more integrated circuits integral or otherwise in communication with a respective network entity (i.e., mobile station, position server, position determining entity, location-based application, LCS client, etc.) or more particularly, for example, a processor 40 of the respective network entity. The design of integrated circuits is by and large a highly automated process. In this regard, complex and powerful software tools are available for converting a logic level design into a semiconductor circuit design ready to be etched and formed on a semiconductor substrate. These software tools automatically route conductors and locate components on a semiconductor chip using well established rules of design as well as huge libraries of pre-stored design modules. Once the design for a semiconductor circuit has been completed, the resultant design, in a standardized electronic format, may be transmitted to a semiconductor fabrication facility or "fab" for fabrication.

In addition to the memory 42, the processor 40 can also be connected to at least one interface or other means for displaying, transmitting and/or receiving data, content or the like. In this regard, the interface(s) can include at least one communication interface 44 or other means for transmitting and/or receiving data, content or the like. As explained below, for example, the communication interface(s) can include a first communication interface for connecting to a first network, and a second communication interface for connecting to a second network. In addition to the communication interface(s), the interface(s) can also include at least one user interface that can include a display 46 and/or a user input interface 48. The user input interface, in turn, can comprise any of a number of devices allowing the entity to receive data from a user, such as a keypad, a touch display, a joystick or other input device.

Reference is now drawn to FIG. 3, which illustrates a block diagram of a mobile station 10 that would benefit from exemplary embodiments of the present invention. The mobile station includes a transmitter 50, a receiver 52, and a controller 54 that provides signals to and receives signals from the transmitter and receiver, respectively. These signals include signaling information in accordance with the air interface standard of the applicable cellular system, and also user speech and/or user generated data. In this regard, the mobile station can be adapted to operate with one or more air interface standards, communication protocols, modulation types, and access types. More particularly, the mobile station can be adapted to operate in accordance with any of a number of first, second and/or third-generation communication protocols or the like. For example, the mobile station may be adapted to operate in accordance with second-generation (2G) wireless communication protocols IS-136 (TDMA), GSM, and IS-95 (CDMA), and third generation protocols like WCDMA, 1XEV-DO and 1XEV-DV. Some narrow-band AMPS (NAMPS), as well as TACS, mobile stations may also benefit from the teaching of this invention, as should dual or higher mode phones (e.g., digital/analog or TDMA/CDMA/analog phones).

It is understood that the controller 54 includes the circuitry required for implementing the audio and logic functions of the mobile station 10. For example, the controller may be comprised of a digital signal processor device, a microprocessor device, and various analog to digital converters, digital to analog converters, and other support circuits. The control and signal processing functions of the mobile station are allocated between these devices according to their respective capabilities. The controller thus also includes the functionality to convolutionally encode and interleave message and data prior to modulation and transmission. The controller can additionally include an internal voice coder (VC) 54A, and may include an internal data modem (DM) 54B. Further, the controller may include the functionally to operate one or more software programs, which may be stored in memory. For example, the controller may be adapted to operate a connectivity program, such as a conventional Web browser. The connectivity program may then allow the mobile station to transmit and receive Web content, such as location-based content from the LCS client 32b, according to the Wireless Application Protocol (WAP), for example. Also, for example, the controller may be adapted to operate a software application adapted to create an authorization for delivery of location information regarding the mobile station, in accordance with exemplary embodiments of the present invention (described below).

The mobile station 10 also comprises a user interface including a conventional earphone or speaker 56, a ringer 58, a microphone 60, a display 62, and a user input interface, all of which are coupled to the controller 54. The user input interface, which allows the mobile station to receive data, can comprise any of a number of devices allowing the mobile station to receive data, such as a keypad 64, a touch display (not shown) or other input device. In exemplary embodiments including a keypad, the keypad includes the conventional numeric (0-9) and related keys (#, *), and other keys used for operating the mobile station.

The mobile station further includes a battery 66, such as a vibrating battery pack, for powering the various circuits that are required to operate the mobile station, as well as optionally providing mechanical vibration as a detectable output, as described below. In addition, the mobile station can include a positioning sensor, such as a global positioning system (GPS) sensor 68. In this regard, the GPS sensor is adapted to determine a location of the mobile station, such as longitudinal and latitudinal directions of the mobile station.

The mobile station 10 can also include memory, such as a subscriber identity module (SIM) 70, a removable user identity module (R-UIM) or the like, which typically stores information elements related to a mobile subscriber. In addition to the SIM, the mobile station 10 can include other memory. In this regard, the mobile station can include volatile memory 72, such as volatile Random Access Memory (RAM) including a cache area for the temporary storage of data. The mobile station can also include other non-volatile memory 74, which can be embedded and/or may be removable. The non-volatile memory can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile station to implement the functions of the mobile station. For example, the memories can include an identifier, such as an international mobile equipment identification (IMEI) code, adapted to uniquely identify the mobile station 10, such as to the MSC 16.

The mobile station 10 can further include an infrared transceiver 76 or another local data transfer device so that data can be shared with and/or obtained from other devices such as other mobile stations, car guidance systems, personal computers, printers, printed materials including barcodes and the like. The sharing of data, as well as the remote sharing of data, can also be provided according to a number of different techniques. For example, the mobile station may include one or more radio frequency transceivers 78 adapted to share data with other radio frequency transceivers, and may thereby function as a WLAN and/or WAN interfaces as described herein. Additionally, or alternatively, the mobile station may share data using Bluetooth brand wireless technology developed by the Bluetooth Special Interest Group. Further, although not shown, the mobile station may include a barcode reader such that the mobile station may receive data according to barcode data transfer techniques.

As indicated in the background section, typically mobile networks are configured such that a LBA/LCS client 32 requests the location (or synonymously, the position) of a mobile station 10 via a single or periodic request that includes a number of parameters for operations triggered by receipt of the request. For periodic requests, for example, the location of the mobile station is determined and reported to the LBA/LCS client in a periodic fashion, where the total number of requests and the time interval between requests, along with other parameters, are specified to the mobile station beforehand by the LBA. As currently defined by 3GPP2 and the OMA, however, all the parameters, including the periodicity, in these requests are constant and cannot be changed unless the current request is torn down and a new request is initiated. Therefore, exemplary embodiments of the present invention provide a framework for an LCS client or location-based application (LBA) within which the LCS client operates, or otherwise in communication with the LCS client, can dynamically change one or more of the parameters of a location request. And although exemplary embodiments of the present invention may be explained herein with reference to periodic requests, it should be understood that exemplary embodiments of the present invention may be equally applicable to single requests, such as single, delayed or deferred requests, without departing from the spirit and scope of the present invention.

In the context of a periodic request, for example, the LBA/LCS client 32 can be configured to dynamically change the periodicity and/or one or more other parameters (e.g., location quality of service) of the periodic request after each instance of determining the location of the mobile station 10, and/or after one or more conditions are met or otherwise changed. As will be appreciated, the LCS client/location-based application can be configured to change the periodicity and/or other parameter(s) based upon any one or more of a number of different conditions. The conditions, in turn, can be dependent upon any one or more of a number of different network entities including, for example, the mobile station, a position server 28 or the like. Also, it should be understood that the LCS/location-based application can change any of a number of different parameter(s), which may be dependent upon any of a number of different network entities and/or the type of operation initiated by the location request. Generally, then, exemplary embodiments of the present invention provide a framework for dynamically changing various parameters of a location request that may affect the effectiveness of a location based service.

Reference is now made to FIGS. 4a-4c and 5a-5c, which illustrate control flow diagrams according to exemplary methods of requesting the location of a mobile station 10 in the context of delivering location-based services. The control flow diagrams illustrate exemplary embodiments of the present invention based upon the periodic location request framework as specified by 3GPP2. More particularly, the control flow diagrams illustrate exemplary embodiments of the present invention in two exemplary mobile-station-assisted positioning contexts, namely, network-initiated (FIGS. 4a-4c) and mobile station-initiated (FIGS. 5a-5c) periodic requests (roaming and non-proxy modes). For more information on such a framework, see 3GPP2 draft specification X.P0024-0 v0.12, entitled: *IP-Based Location Services* (to be published as specification X.S0024-0 v1.0), the contents of which are hereby incorporated by reference in its entirety. It should be understood, however, that exemplary embodiments of the present invention are equally applicable to other frameworks for requesting the location of a mobile station, including that specified by OMA. Further, it should be understood that although a number of messages and parameters may be shown and described as including particular names, those names are solely for purposes of explanation and should be taken without loss of generality and not to limit the scope of exemplary embodiments of the present invention.

Exemplary embodiments of the present invention operate based upon the periodic tracking mechanism described in the current version of the 3GPP2 specification. In these exemplary embodiments, it may be assumed that the mobile station 10 is roaming in a visited network 24b that is served by LCS network elements serving position server 28b and serving position determining entity 30b. The corresponding LCS network elements in the home network are the home position server 28a and the home position determining entity 30a. The network-based application is represented by the network-based LBA 32a and the associated LCS client 32b. It is to be understood that exemplary embodiments of the present invention are equally applicable to instances when the mobile station is not roaming in a visited network, but is instead operating in the home network 24a. Further, exemplary embodiments of the present invention are also equally applicable to instances when a roaming mobile station uses the proxy mode (connectivity to the visited network is via the home network 24a) for connectivity, or when a mobile node (roaming or non-roaming, proxy or non-proxy mode) issues a non-periodic request or any other scenario.

I. Network-Initiated Periodic Request: Mobile Station-Assisted Positioning

Effectuating a network-initiated periodic request with mobile station-assisted positioning in accordance with one exemplary embodiment of the present invention includes a network-based LBA 32a with an associated (not necessarily co-located) LCS client 32b requesting periodic reporting of location information for a target mobile station 10 from the home position server 28a, as shown at step-a of FIG. 4a. This request may include the mobile station identity, attributes of the desired location estimate including, for example, the Position Quality of Service (PQOS). Also, as described in the current version of the 3GPP2 specification, the request may include a parameter (PERIODIC) with the time interval (TIME_INT) and the number of location reports. And in various instances, a special code may be assigned to the time duration parameter (DURATION) to indicate that the location requests have to be done whenever the mobile station is switched on. It should be noted that the current version of the 3GPP2 specification does not include a DURATION value in such a request.

As shown at step-b, the home position server 28a can authenticate the requesting LBA/LCS client 32, and can verify that the LBA/LCS client is authorized to obtain location information for the target mobile station 10 and that the target mobile station subscriber's LDC (location distribution control) information permits the LBA to obtain the mobile station's location. In addition, the home position server can assign an LCS correlation ID (LCS_CORRID) for the location information request.

The home position server 28a can then notify the target mobile station 10 of the network-initiated request for reporting its location information by sending a SUPL_INIT message to the target mobile station (e.g., via WAP PUSH or SMS). The message may include the mobile station identity (MSID), attributes of the desired location estimate (e.g., PQOS), the time interval and the number of location reports (PERIODIC) and any information (e.g., pop-up text) to be used in obtaining the consent of the end user for location tracking. In addition, the message may include the LCS_CORRID parameter, and a POSMODE parameter that is set to indicate the positioning mode to be used for the Periodic Position Reporting session (e.g., mobile station-Assisted AGPS). Receipt of the SUPL_INIT message at the target mobile station may activate the mobile station LCS client 32b. If so desired, the mobile station LCS client may prompt the user (e.g., via pop-up message) for consent to provide location information to the network-based LBA 32a. In such instances, the subsequent messaging may proceed if the user provides consent.

At step-c, the mobile station LCS client 32b within the mobile station 10 can request a PDE 30 by sending sends a SUPL_START message to the home position server 28a. The message may include the mobile station identity (MSID), positioning capabilities (e.g., TIA-801 positioning capabilities) of target mobile station (MS_INFO), attributes of the desired location estimate (e.g., PQOS), the time duration of the periodic location reporting session (DURATION), and current serving system information (ServingCellinfo). For serving CDMA systems, for example, the ServingCellinfo may include the SID (System Identification Number), NID (Network Identification Number), BASE_ID (Base Station Identification) and/or other parameters. Alternatively, for example, for serving HRPD systems, the ServingCellinfo may include the SECTOR_ID and/or other parameters. The SUPL_START message from the mobile station LCS client may also include the LCS_CORRID parameter set to the value received at step-b, thereby enabling the home position server to correlate the respective message with the location information request received from the network-based LCS client.

At step-d, the home position server 28a can verify that the subscriber's LDC settings permit the network-based LBA 32a to obtain the target mobile station's location information, and determine if the mobile station 10 is roaming in another network. If the home position server verifies the LDC settings, the mobile station is roaming and the home position server does not have the IP address of its serving position server 28b, the home position server can formulate a fully qualified domain name using the received SID and NID parameter values (e.g., NID.SID.cdma.lcs_manager.lcs.net), and query an appropriate domain name server (DNS). Then, at step-e, if the DNS lookup is performed at step-d, the DNS can respond to the home position server.

At step-f, the home position server 28a can forward the SUPL request for a PDE 30 to the serving position server 28b as a PS_REQ message. The forwarded request may include information received from the target mobile station 10 in the SUPL_START message, and may further identify of the home position server (PS_ID). As will be appreciated, the home position server and serving position server may have a security association (VPN connection, SSL/TLS, etc.) that can be used to protect the messaging therebetween.

At step-g, the serving position server 28b can send a PDE_REQ message to a selected position determining entity (PDE) 30b assigned to assist the target mobile station in positioning (e.g., TIA-801 positioning), thereby requesting that the position determining entity reserve resources and await an IP session from the target mobile station 10. The PDE_REQ message may include the same information as in the PS_REQ including the DURATION parameter, which may indicate the time duration over which sessions (e.g., TIA-801 sessions) may occur for periodic location reporting. The position determining entity can respond to the serving position server 28b with an acknowledgement (PDE_ACK) message that includes a port number (PORTNUM) assigned by the position determining entity for location determination, as shown at step-h. Then, at step-i, the serving position server can send the position determining entity address information (PDE_ADDRS) to the home position server 28a in a further acknowledgement (PS_ACK) message, which may also include the MSID and LCS_CORRID parameters. In addition, the PS_ACK message may include a RESULT_TYPE parameter set to indicate non-proxy mode reflecting that the mobile station should send all messages (e.g., TIA-801 messages) directly to the position determining entity.

At step-j, the home position server 28a can send the received position determining entity information to target mobile station 10 in a SUPL_RESPONSE message. Thereafter, the target mobile station can establish a secure IP connection with the position determining entity 30b and send a position session message (SUPL_POS) to the position determining entity to request a periodic location session, as shown at step-k. The SUPL_POS may include an initial position-determination message (e.g., TIA-801 message) for effectuating a periodic location session. Next, at step-l, position-determination messages (e.g., TIA-801 messages) can be exchanged between the mobile station 10 and the position determining entity 30b, with position information including the determined position of the target mobile station being made available at the position determining entity 30b. Each position-determination message (e.g., TIA-801 message) may be included in a SUPL_POS message sent between the target mobile station 10 and the position determining entity.

At step-m, the position determining entity 30b can send a report (PDE_REPORT) to the serving position server 28b which, for mobile station-assisted location determination, includes the target mobile station's location information. This information may include, for example, a location information parameter (POSINFO) and a location result parameter (POSRSULT). At step-n, the serving position server can send a report (PS_REPORT) to the home position server 28a, where the report includes the location information received from the position determining entity. Then, at step-o, the home position server 28*a* can report the first set of the target mobile station's location information to the network-based LBA/LCS client 32.

Whenever, during the execution of this periodic request, the conditions present themselves for a change in the parameters of the request, the network-based LBA 32*a* can determine new values of any parameters (including the time interval) for subsequent location reports. For this, the LBA can formulate a message (IP_LOC_CHG) to request a change in one or more parameters. This message can then be sent by the network-based LBA (in a network initiated scenario) via the associated LCS client 32*b* to the home-position server 28*a*, as shown at step o-1 in FIG. 4*b*. It should be noted, however, that if the LCS client does not allow the request, the LCS client 32*b* may drop the request from the LBA and not send the IP_LOC_CHG request to the home position server. The LCS client in the network may then intimate the LBA of this decision (not shown in figure).

This IP_LOC_CHG request may include the MSID, the new set of parameters (e.g., TIME_INT), and the LBA_ID (step o-1). Upon receiving the request, the home position server 28*a* can verify that the LBA/LCS client 32 is authentic and is authorized to make the changes to the parameters for the periodic location session with the mobile station 10. The mobile station may be identified using a CORR_ID parameter within the IP_LOC_CHG message or other means such as key verification, etc. The home position server can also make sure that such a change in parameters will not adversely affect the LCS network. And if the home position server determines for any reason that the LBA cannot change the parameters, the LBA/LCS client 32 can be informed (not shown in figure) that such a change of parameters cannot accomplished.

If the changes to parameters are allowed, the home position server 28*a* can then determine whether the serving position determining entity 30*b* and position server 28*b* need to be informed about the changes in the parameters, such as in any of a number of different manners based on or independent of the parameters being changed. For example, if the serving position determining entity/position server charge a flat fee for a positioning service, the home position server may determine that the serving position determining entity/position server need not be informed about the changes in the parameters. Although even in instances of a flat fee, the home position server may still determine that the serving position determining entity/position server need be informed about the changes in the parameters, such as to permit those entities to allocate, re-allocate and/or dis-allocate resources based on the change. For example, the home position server may determine that the serving position determining entity needs be informed about an increase in periodicity so as to accommodate the increased frequency of location reporting. Although even in such instances, if the serving position determining entity is not willing or able to accommodate or permit the parameter changes, the serving position server may, if so desired, change to a different serving position determining entity that is willing and able to accommodate the parameter changes.

If it is determined that the serving position server/position determining entity 28*b*/30*b* need to be notified, the home position server 28*a* can send a parameter change request (PS_REQ_CHG) message to the serving position server, as shown at step o-2. The parameter change request message may include the LCS_CORRID and home position server ID (PS_ID), as well as the mobile station identity (MSID), the positioning capabilities (e.g., TIA-801 positioning capabilities) of the target mobile station (MS_INFO) and attributes of the desired location estimate (PQOS). In addition, the parameter change request message may include information to indicate the DURATION of the request.

On the receipt of the parameter change request message, the serving position server 28*b* can authenticate the message and make sure that the home position server 28*a* is authorized to make such a change. The serving position server may also make sure that its LCS system can handle such a change of parameters. If for any reason the change of parameters is not acceptable, the serving position server can reject the change and inform the home position server of this decision (not shown). Alternatively, the serving position server may change to a different serving position determining entity 30*b* and setup keys and pass on the information to the home position server. The home position server may then forward the reject message to the LBA/LCS client, or in the case of changing the serving position determining entity, forward the new position determining entity information to the mobile station 10 (not shown).

If the changes to the parameters are acceptable to the serving position server 28*b*, the serving position server can then forward the request from the home position server 28*a* to the serving position determining entity 30*b* (if the position determining entity needs to be informed) using a PDE_REQ_CHG message, as shown at step o-3. The parameters in this message may include one or more of the same parameters as in the PS_REQ_CHG message, as shown in FIG. 4*b*. If the serving position determining entity is able to confirm the changes, the serving position determining entity can send a confirmation (PDE_CHG_CONFIRM) message to the serving position server (step o-4), which then forwards the serving position determining entity's confirmation to the home position sever via a PS_CHG_CONFIRM message (step o-5). If in any case the serving position determining entity is not able to accept the change of parameters after receiving the message in step o-3, however, the server position determining entity can send a reject message to the serving position server 28*b* (not shown), which can then forward the rejection to the home position server 28*a* (not shown). In turn, the home position server can forward the rejection to the network-based LBA/LCS client 32 (not shown).

It is to be noted again, that steps o-2 through o-5 in FIG. 4*b* are optional and depend on the parameters that are being changed and other considerations. The home position server 28*a* can decide whether these messages are sent. The messages described in steps o-2 through o-5 can also be protected using a trust/security relationship between the entities involved the messaging sequence. Similarly, the "reject" messages described herein but otherwise not shown in the figures may also be protected using this trust/security relationship.

Once the home position server 28*a* has made sure that the parameters can be changed, the home position server can inform the mobile station 10 about the change in parameters via a notification (SUPL_CHG) message, as shown at step o-6 of FIG. 4*b*. The notification message may include the LCS_CORRID, as well as attributes of the desired location estimate (PQOS), and the time interval and the number of location reports (PERIODIC), where one or more of these parameters may be the changed parameters. This message can be transported to the mobile station in a number of different manners including, for example, over SMS, IP or WAP-_PUSH. This message may also be protected, such as in a manner similar to the way the initial SUPL_INIT in step-b of FIG. 4*a* is protected, so that the mobile station can authenticate the message as to being sent by the home position server.

The mobile station 10 may also optionally reject any of the changes being requested and send a reject message to the home position server (not shown). In such instances, the home position server 28a can inform the network-based LBA/LCS client 32 about the mobile station's decision (not shown). These messages may also be appropriately protected.

As shown at steps p-t, after some time, steps k-o may be repeated to report the target mobile station's second set of location information. In such instances, the steps may be repeated with the following exception: the current serving system information (ServingCellinfo) may be included in the initial SUPL_POS sent to the position determining entity 30b (step-p) for the next positioning session. The location information calculated in step-t can be based on the new set of parameters agreed to in step o-6.

At steps u-y of FIG. 4c, steps p-t can be repeated at intervals to report the target mobile station's location information until the last set of location information is sent to the network-based LBA/LCS client 32. Note that the last location estimate may be configured to occur within the specified time duration (DURATION). Once the duration expires, the position determining entity 30b may no longer process any location request from the mobile station 10. Steps o-1 through o-6 may occur at multiple times in the periodic location tracking sequence described herein.

Although the exemplary embodiment describes that the reason for initiating a change in parameters may be based on the location of the mobile station 10, although it should be understood that this condition is not required for initiating such a change. The reasons for change of parameters and the entities involved in initiating the change can be different and may be dependent on the application or the entity requesting the change.

II. Mobile Station-Initiated Periodic Request: Mobile Station-Assisted Positioning Effectuating a mobile station-initiated periodic request with mobile station-assisted positioning in accordance with one exemplary embodiment of the present invention includes activating a LBA 32a in the target mobile station 10 (e.g., from the user's interface menu), as shown at step-a of FIG. 5a. As illustrated at step-b, the LBA can then invoke a LCS client 32b within the target mobile station, such as for periodic location reports. The LCS client may prompt the user for permission to provide the mobile station's location information to the LBA.

The network entities may then perform steps c-1, such as in a manner similar to corresponding steps of FIG. 4a. More particularly, as shown at step-c, the mobile station LCS client 32b can request a periodic location session with a PDE 30 by sending send a SUPL_START message to the home position server 28a, where the SUPL_START message may include an LCS correlation ID (LCS_CORRID) assigned by the LCS client. Then, at step-d, the home position server 28a can verify that the subscriber's LDC settings permit the LBA to obtain the target mobile station's location information, and determine if the mobile station 10 is roaming in another network. If the home position server verifies the LDC settings, the mobile station is roaming and the home position server does not have the IP address of the serving position server 26, the home position server can formulate a fully qualified domain name using the received SID and NID parameter values (from the ServingCellinfo), and query an appropriate domain name server (DNS). Then, at step-e, if the DNS lookup is performed at step-d, the DNS can respond to the home position server.

At steps f and g, the home position server 28a can forward the SUPL request for a PDE 30 to the serving position server 28b as a PS_REQ message, to which the serving position server can respond by sending a PDE_REQ to the selected position determining entity 30b assigned to assist the target mobile station 10 in positioning (e.g., TIA-801 positioning). Then, at steps h and i, the position determining entity can respond to the serving position server with an acknowledgement (PDE_ACK) message, to which the serving position server may respond by sending a further acknowledgment (PS_ACK) message to the home position server.

At steps j and k, the home position server 28a can send the received position determining entity information to target mobile station 10 in a SUPL_RESPONSE message, after which the mobile station can establish a secure IP connection with the position determining entity 30b and send a location session message (SUPL_POS) to the position determining entity. Then, at step-l, position-determination messages (e.g., TIA-801 messages) can be exchanged, with the target mobile station's location information being made available at the mobile station 10, or more particularly the LCS client of the mobile station.

Next, at step-m, the position determining entity can send a report (PDE_REPORT) to the serving position server 28b, such as for data recording purposes to indicate the type of service (e.g., TIA-801 service) provided to the mobile station. In this regard, similar to the corresponding step of FIG. 4a, the report may include the MSID and LCS_CORRID. In turn, the serving position server can send a report (PS_REPORT) to the home position server 28a, such as for a similar purpose as that for sending the PDE_REPORT, as shown at step-n.

At step-o, the mobile station-based LCS client 32b can provide the initial set of target mobile station location information to the mobile station-based LBA 32a which, in turn, can provide a service to the mobile station based on the received location information, as shown at step-p.

Periodically, steps k-p may be repeated to report the target mobile station's location information to the mobile station-based LBA 32a. If at any time during the execution of the periodic request the mobile station-based LBA desires to change any parameters in the periodic location session, the LBA may initiate the steps described below. In this regard, the mobile station-based LBA 32a (or the mobile station 10 or the mobile station based LCS client 32b) may use any information to determine the new parameters including, for example, the current location, past history of the location, moving speed of the mobile station 10, and the like. These new parameters may be sent in a request to the mobile station-based LCS client 32b, as shown at step p-1 of FIG. 5b. At the determined time interval, then, steps k-p can be repeated to report the target mobile station's location information to the mobile station-based LBA based on the new values of the parameters. If the mobile station-based LCS client or the mobile station 10 decides not to allow the change of parameters request from the LBA it can drop the request and send a reject message to the LBA (not shown).

In various instances, the home position server 28a or serving position server 28b or position determining entity 30b may not need to be notified when the mobile station-based LBA 32a decides to change the parameters. Alternatively, if the home position server and serving position server/position determining entity need to be notified of a change of parameters, a SUPL_CHG message may be sent at one or more instances the LBA decides to change the period or any other parameters. The SUPL_CHG message may include the MSID, LCS_CORRID, PERIODIC and PQOS parameters, and can be sent over a variety of transports such as, for example, SMS, IP or the like. This is shown as step p-2 in FIG. 5b. The delivery of this message may also be secure. On receipt of the SUPL_CHG message, the home position server can authenticate the mobile station 10 and possibly the LBA/LCS client 32 to make sure that it is authorized to make the changes. If the home position server decides that the serving position server and position determining entity need to be informed about the change in parameters, the home position server may initiate steps p-3 through p-6, as shown FIG. 5b. These messages and reasoning behind these messages may be very similar to steps o-2 through o-5 of FIG. 4b.

After making sure that the change in parameters can be allowed, the home position server 28a can send a confirmation (SUPL_CHG_CONFIRM) message to the mobile station-based LBA/LCS client 32, as shown in steps p-7 and p-8 of FIG. 5b. If for any reason any of the network entities (home position server, serving position server 28b, serving position determining entity 30b, etc) decide to reject the change, mobile station-based LBA/LCS client can be informed that the change of parameters has been denied using a SUPL_CHG_DENY message (not shown). The SUPL_CHG_CONFIRM and SUPL_CHG_DENY messages, when sent, may be protected using the trust/security relationship that exists between the mobile station and the home position server. The transport for these messages may be IP, SMS or any other suitable transport.

As shown at steps q and r of FIG. 5c (this is from the current 3GPP2 specification), when the last location estimate is required, the mobile station-based LCS client 32b can send a SUPL_POS to the position determining entity 30b, and exchange position-determination messages (e.g., TIA-801 messages) with the position determining entity, with the target mobile station's location information being made available at the mobile station 10. In this regard, steps q and r may be performed in a manner similar to steps u and v of FIG. 4c for the last location estimate.

At step-s, the position determining entity can send a report (PDE_REPORT) to the serving position server 28b, such as for data recording purposes to indicate the type of service (e.g., TIA-801 service) provided to the mobile station. Similar to step-w of FIG. 4c, the report may include the MSID and LCS_CORRID. In turn, the serving position server can send a report (PS_REPORT) to the home position server 28a, such as for a similar purpose as that for sending the PDE_REPORT, as shown at step-t.

At step-u, the mobile station-based LCS client 32b can provide the final set of target mobile station location information to the mobile station-based LBA 32a which, in turn, can provide a service to the mobile station based on the received location information, as shown at step-v. Note that, as before, the last location estimate may occur within the specified time duration (DURATION). Once the duration has expired, then, the position determining entity 30b may no longer process any location request from the mobile station.

As shown and described above with respect to FIGS. 4a-4c and 5a-5c, a periodic request is made in lieu of a conventional periodic request, such as that currently specified by 3GPP2. Exemplary embodiments of the present invention have been shown and described as a framework to effect changes in parameters of LCS messaging using the periodic location request specification. It should be understood, however, that the framework is not specific to only periodic messages. In this regard, the framework of exemplary embodiments of the present invention may be equally applicable in any scenario wherein the location of the mobile station has not yet been determined. Further, it should also be understood that involvement of different LCS network entities such as the serving position server 28b, position determining entity 30b and the like may be optional.

To further illustrate the benefits of exemplary embodiments of the present invention, consider the context of WLAN-WAN interworking. In such a context, consider a mobile station 10 that is currently roaming in a WAN environment implementing the system and method of exemplary embodiments of the present invention to determine when to turn on its WLAN interface. This is without loss of generality and a similar procedure may be undertaken for the transition from the WLAN to the WAN. For purposes of this exemplary context, also consider that the mobile station initiates the location request such that the LBA 32a resides in the mobile station (see FIGS. 5a-5c). To assist the mobile station to decide when to turn on the WLAN interface and start scanning, a periodic location request is made by the LBA.

Initially, a mobile station-based LBA 32a can be pre-provisioned with a database that includes a listing of possible locations where WLAN APs 36 in FIG. 1b are deployed (along with information required to connect to these APs). In this regard, the mobile station-based LBA may be pre-configured with an initial database listing. The mobile station can then optionally add to this database using a learning process. More particularly, when the user turns on the WLAN interface and connectivity is established, the location of the mobile station can be determined and appropriate information added to the database. That is, when a successful WLAN connection is achieved, the LBA can create a new entry in the database binding the WLAN AP's SSID (along with other relevant information) with the current location of the mobile station. Accordingly, whenever the mobile station subsequently moves near this location, the mobile station may turn on the WLAN interface and start scanning for an appropriate WLAN AP. As the mobile station roams, this database can be gradually built up. The database may also include information on approximate areas of coverage of the WLAN and WAN interfaces. For example, if the mobile station periodically tracks its location and also adds the signal strength information at that location into the database, the mobile station (or mobile station-based LBA) may infer when, say, the WLAN coverage will end and when the WAN interface must be turned on. Additionally or alternatively, a user may manually create and/or update the database. Further, the database and/or updates to the database may be downloaded from a network entity across one or more networks (e.g., home network 24a, visited network 24b, WLAN 34, etc.).

In operation, then, when the mobile station 10 finds that its current location is proximate any of the locations listed in the database, the mobile station may turn on its WLAN interface and start scanning for possible WLAN connection availability from one or more APs 36. Although the proximity distance can vary from one application to another, the proximity distance can be from a few feet up to several hundred feet or more. Irrespective of the proximity distance, however, as the mobile station approaches an area including a WLAN AP, the probability of connecting to such an AP increases. Thus, as the mobile station approaches such an area, it may be desirable for the mobile station-based LBA 32a to increase the frequency or periodicity with which it requests the mobile station's location. Accordingly, when the location of the mobile station is within a threshold distance of a WLAN AP, the mobile station can turn on its WLAN interface and begin scanning for an AP. Conversely, as the mobile station moves farther away from an area including a WLAN AP, it may be desirable for the mobile station-based LBA to decrease the periodicity or frequency (the parameter that is changed in this case) with which it requests the mobile station's location.

In addition to or in lieu of changing the periodicity based upon a distance of the mobile station 10 to an AP 36, the period may also be dependent on other information the mobile station may have or otherwise acquire. For example, the periodicity can depend on the velocity of the mobile station, which can be derived from the previous locations. In this regard, a shorter period for location request may be desired if the mobile station is moving relatively fast, and vice versa. Additionally or alternatively, for example, the periodicity may depend on signal-to-interference ratio (SIR) or signal-to-noise ratio (SNR), with the periodicity being reduced as the SIR decreases, and vice versa. In such instances, the SIR value of the interface can be stored along with the location parameter such that the LBA can anticipate future loss of SIR based on its current location, and therefore optimize its periodicity.

Based on the foregoing description, as read in view of the appended drawing figures, it should be apparent that some examples of the invention relate to a system adapted to dynamically change a request for location information. Examples of the invention further relate to a method of dynamically changing a request for location information, wherein the method comprises the steps of: (1) receiving a periodic request for location information regarding a mobile station, wherein the request includes one or more parameters; (2) the mobile station or a network-based LBA initiating a message, if needed, to the home position server describing the change in parameters; (2a) the home position server authenticating and authorizing the request; (2b) the home position server requesting the serving position server and position determining entity to confirm the changes; (2c) the serving position server and position determining entity conveying their acceptance of the changes to the home position server; (2d) the home position server sending a message to the mobile station either notifying of the changes requested, or confirming that the changes have been accepted by the network entities involved; (3) the mobile station contacting the position determining entity with the new parameters and receiving service according to the new set of parameters.

According to one aspect of the present invention, all or a portion of the system of the present invention generally operates under control of a computer program product. The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIGS. 4a-4c and 5a-5c are control flow diagrams of methods, systems and program products according to the invention. It will be understood that each block or step of the control flow diagrams, and combinations of blocks in the control flow diagram and flowchart, can be implemented by computer program instructions. These computer program instructions may be loaded onto a computer or other programmable apparatus to produce a machine, such that the instructions which execute on the computer or other programmable apparatus create means for implementing the functions specified in the block(s) or step(s) of the control flow diagrams. These computer program instructions may also be stored in a computer-readable memory that can direct a computer or other programmable apparatus to function in a particular manner, such that the instructions stored in the computer-readable memory produce an article of manufacture including instruction means which implement the function specified in the block(s) or step(s) of the control flow diagrams. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block(s) or step(s) of the control flow diagrams.

Accordingly, blocks or steps of the control flow diagrams support combinations of means for performing the specified functions, combinations of steps for performing the specified functions and program instruction means for performing the specified functions. It will also be understood that each block or step of the control flow diagrams, and combinations of blocks or steps in the control flow diagrams, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific exemplary embodiments disclosed and that modifications and other embodiments are intended to be included within the scope of the appended claims. For example, if the mobile station has in-built functionality of a position determining entity, then the functionality described with respect to the position determining entity may be internal to the mobile station. In another exemplary embodiment, the change in parameters may be initiated by an authorized network entity like the home position server for the purpose of reducing the load on the LCS network. In such a case the messaging described between the network-based LBA and home position server and the messaging between the mobile station-based LBA and the home position server do not exist. The home position server may send a message like SUPL_CHG to the mobile station requesting the mobile station to change the parameters. The home position server may also propagate these changes to the associated position determining entity. The conditions necessitating the change may also vary according to the application requesting the change. It could be the current location, battery power level at the mobile station, etc. Similarly, the illustrated exemplary embodiments of the present invention make an exemplary assumption that the mobile station is roaming in a visited network, and uses a non-proxy mode (direct connection with the position determining entity in the visited network) of connectivity. The examples do not in anyway limit the scope of this invention. The invention is applicable, for example, when the mobile station is not roaming and when the mobile station uses the proxy-mode (communicating with the visited network via network elements in the mobile station's home network) and the location request in itself is non-periodic. Although specific terms are employed herein, they are used in a generic and descriptive sense only and not for purposes of limitation.

What is claimed is:

1. An apparatus comprising:
a processor; and
a memory including computer program code,
the memory and the computer program code configured to, with the processor, cause the apparatus to at least:
cause initiation of a location reporting session for determining and reporting a current location of a mobile station based on one or more parameters having one or more associated values; and
change the value of one or more of the parameters in response to the mobile station meeting one or more conditions and during the location reporting session such that the same location reporting session continues based on the changed values of the one or more parameters, wherein at least one of the one or more conditions includes a comparison between a reported current location of the mobile station and one or more predetermined locations, and meeting the respective at least one of the one or more conditions includes the reported current location of the mobile station being proximate at least one of the one or more predetermined locations.

2. An apparatus according to claim 1, wherein the location reporting session comprises a periodic location reporting session, one of the parameters comprising a periodicity of reporting the current location of the mobile station, and wherein being configured to cause the apparatus to change the value of one or more of the parameters includes being configured to cause the apparatus to change the value of the periodicity such that the same periodic location reporting session continues based on the changed value of the periodicity.

3. An apparatus according to claim 1, wherein the one or more parameters include a location quality of service, and wherein being configured to cause the apparatus to change the value of one or more of the parameters includes being configured to cause the apparatus to change the value of the location quality of service such that the same location reporting session continues based on the changed value of the location quality of service.

4. An apparatus according to claim 1, wherein the location reporting session includes communication between a plurality of entities including the mobile station, a home position server and a position determining entity, and wherein being configured to cause the apparatus to change the value of one or more parameters includes being configured to cause the apparatus to cause notification of at least one of the home position server or the position determining entity of the changing of the value of one or more of the parameters.

5. An apparatus according to claim 1, wherein the apparatus is located remote from the mobile station, and the location reporting session further including exchanging messages between a LoCation Services (LCS) client of the mobile station and a position determining entity to thereby determine the current position of the mobile station, and
wherein the memory and the computer program code are further configured to, with the processor, cause the apparatus to further receive a report of the current position of the mobile station via the position determining entity.

6. An apparatus according to claim 1, wherein the apparatus is co-located with the mobile station, and the location reporting session further including exchanging messages between a LoCation Services (LCS) client of the mobile station and a position determining entity to thereby determine the current position of the mobile station, and
wherein the memory and the computer program code are further configured to, with the processor, cause the apparatus to further receive a report of the current position of the mobile station via the LCS client of the mobile station.

7. An apparatus according to claim 1, wherein the location reporting session includes determining and reporting a current location of a mobile station at a plurality of instances, and wherein being configured to cause the apparatus to change the value of one or more parameters includes being configured to cause the apparatus to change the value of one or more of the parameters after at least some of the instances of determining and reporting the current location of the mobile station.

8. An apparatus according to claim 1, wherein the reported current location of the mobile station is proximate at least one of the one or more predetermined locations when the mobile station is within a threshold distance of any of the one or more predetermined locations.

9. An apparatus according to claim 8, wherein the memory and the computer program code are further configured to, with the processor, cause the apparatus to further:
cause storage of a database that lists a plurality of predetermined locations reflecting locations of wireless network access points,
wherein the apparatus is caused to change the value of the one or more of the parameters in response to the reported current location of the mobile station being within the threshold distance of any of the predetermined locations listed in the database.

10. An apparatus according to claim 9, wherein the memory and the computer program code are further configured to, with the processor, cause the apparatus to further:
cause establishment of connectivity with a wireless network access point having a location not listed in the database; and in response thereto,
add the respective wireless network access point to the database, the respective wireless network access point being associated in the database with the reported current location of the mobile station at the instance of the establishment of connectivity with the respective wireless network access point.

11. A method comprising:
causing initiation of a location reporting session for determining and reporting a current location of a mobile station based on one or more parameters having one or more associated values; and
changing the value of one or more of the parameters in response to the mobile station meeting one or more conditions and during the location reporting session such that the same location reporting session continues based on the changed values of the one or more parameters, wherein at least one of the one or more conditions includes a comparison between a reported current location of the mobile station and one or more predetermined locations, and meeting the respective at least one of the one or more conditions includes the reported current location of the mobile station being proximate at least one of the one or more predetermined locations.

12. A method according to claim 11, wherein the location reporting session comprises a periodic location reporting session, one of the parameters comprising a periodicity of reporting the current location of the mobile station, and wherein changing the value of one or more of the parameters comprises changing the value of the periodicity such that the same location reporting session continues based on the changed value of the periodicity.

13. A method according to claim 11, wherein the one or more parameters include a location quality of service, and wherein changing the value of one or more of the parameters comprises changing the value of the location quality of service such that the same location reporting session continues based on the changed value of the location quality of service.

14. A method according to claim 11, wherein the location reporting session includes communication between a plurality of entities including the mobile station, a home position server and a position determining entity, and wherein changing the value of one or more of the parameters includes notifying at least one of the home position server or the position determining entity of the changing of the value of one or more of the parameters.

15. A method according to claim 11, wherein causing initiation of a location reporting session and changing the value of one or more of the parameters are performed by an apparatus including a processor configured to cause the apparatus to cause initiation of a location reporting session and change the value of one or more of the parameters, the apparatus being located remote from the mobile station, the location reporting session further including exchanging messages between a LoCation Services (LCS) client of the mobile station and a position determining entity to thereby determine the current position of the mobile station, the current position of the mobile station being reported to the apparatus via the position determining entity.

16. A method according to claim 11, wherein causing initiation of a location reporting session and changing the value of one or more of the parameters are performed by an apparatus including a processor configured to cause the apparatus to cause initiation of a location reporting session and change the value of one or more of the parameters, the apparatus being co-located with the mobile station, the location reporting session further including exchanging messages between a LoCation Services (LCS) client of the mobile station and a position determining entity to thereby determine the current position of the mobile station, the current position of the mobile station being reported to the apparatus via the LCS client of the mobile station.

17. A method according to claim 11, wherein the location reporting session includes determining and reporting a current location of a mobile station at a plurality of instances, and wherein changing the value of one or more of the parameters comprises changing the value of one or more of the parameters after at least some of the instances of determining and reporting the current location of the mobile station.

18. A method according to claim 11, wherein the reported current location of the mobile station is proximate at least one of the one or more predetermined locations when the mobile station is within a threshold distance of any of the one or more predetermined locations.

19. A method according to claim 18 further comprising:
causing storage of a database that lists a plurality of predetermined locations reflecting locations of wireless network access points,
wherein changing the value of one or more of the parameters includes changing the value of one or more of the parameters in response to the reported current location of the mobile station being within the threshold distance of any of the predetermined locations listed in the database.

20. A method according to claim 19 further comprising:
causing establishment of connectivity with a wireless network access point having a location not listed in the database; and in response thereto,
adding the respective wireless network access point to the database, the respective wireless network access point being associated in the database with the reported current location of the mobile station at the instance of the establishment of connectivity with the respective wireless network access point.

21. A non-transitory computer-readable storage medium having computer-readable program code portions stored therein, the computer-readable storage medium and computer-readable program code portions being configured to, with a processor, cause an apparatus to at least:
cause initiation of a location reporting session for determining and reporting a current location of a mobile station based on one or more parameters having one or more associated values; and
change the value of one or more of the parameters in response to the mobile station meeting one or more conditions and during the location reporting session such that the same location reporting session continues based on the changed values of the one or more parameters, wherein at least one of the one or more conditions includes a comparison between a reported current location of the mobile station and one or more predetermined locations, and meeting the respective at least one of the one or more conditions includes the reported current location of the mobile station being proximate at least one of the one or more predetermined locations.

22. A non-transitory computer-readable storage medium according to claim 21, wherein the location reporting session comprises a periodic location reporting session, one of the parameters comprising a periodicity of reporting the current location of the mobile station, and wherein being configured to cause the apparatus to change the value of one or more parameters includes being configured to cause the apparatus to change the value of the periodicity such that the same location reporting session continues based on the changed value of the periodicity.

23. A non-transitory computer-readable storage medium according to claim 21, wherein the one or more parameters include a location quality of service, and wherein being configured to cause the apparatus to change the value of one or more parameters includes being configured to cause the apparatus to change the value of the location quality of service such that the same location reporting session continues based on the changed value of the location quality of service.

24. A non-transitory computer-readable storage medium according to claim 21, wherein the location reporting session includes communication between a plurality of entities including the mobile station, a home position server and a position determining entity, and wherein being configured to cause the apparatus to change the value of one or more parameters includes being configured to cause the apparatus to cause notification of at least one of the home position server or the position determining entity of the changing of the value of one or more of the parameters.

25. A non-transitory computer-readable storage medium according to claim 21, wherein the apparatus is located remote from the mobile station, and the location reporting session further including exchanging messages between a LoCation Services (LCS) client of the mobile station and a position determining entity to thereby determine the current position of the mobile station, and
wherein the computer-readable storage medium and computer-readable program code portions are further configured to, with the processor, cause the apparatus to further receive a report of the current position of the mobile station via the position determining entity.

26. A non-transitory computer-readable storage medium according to claim 21, wherein the apparatus is co-located with the mobile station, and the location reporting session further including exchanging messages between a LoCation Services (LCS) client of the mobile station and a position determining entity to thereby determine the current position of the mobile station, and
wherein the computer-readable storage medium and computer-readable program code portions are further configured to, with the processor, cause the apparatus to further receive a report of the current position of the mobile station via the LCS client of the mobile station.

27. A non-transitory computer-readable storage medium according to claim 21, wherein the location reporting session includes determining and reporting a current location of a mobile station at a plurality of instances, and wherein being configured to cause the apparatus to change the value of one or more parameters includes being configured to cause the apparatus to change the value of one or more of the parameters after at least some of the instances of determining and reporting the current location of the mobile station.

28. A non-transitory computer-readable storage medium according to claim 21, wherein the reported current location of the mobile station is proximate at least one of the one or more predetermined locations when the mobile station is within a threshold distance of any of the one or more predetermined locations.

29. A non-transitory computer-readable storage medium according to claim 28, wherein the computer-readable storage medium and computer-readable program code portions are further configured to, with the processor, cause the apparatus to further:
- cause storage of a database that lists a plurality of predetermined locations reflecting locations of wireless network access points,
- wherein the apparatus is caused to change the value of the one or more of the parameters in response to the reported current location of the mobile station being within the threshold distance of any of the predetermined locations listed in the database.

30. A non-transitory computer-readable storage medium according to claim 29, wherein the computer-readable storage medium and computer-readable program code portions are further configured to, with the processor, cause the apparatus to further:
- cause establishment of connectivity with a wireless network access point having a location not listed in the database; and in response thereto,
- add the respective wireless network access point to the database, the respective wireless network access point being associated in the database with the reported current location of the mobile station at the instance of the establishment of connectivity with the respective wireless network access point.

* * * * *